United States Patent [19]

Hancock

[11] 4,272,263
[45] Jun. 9, 1981

[54] FILTER ARRANGEMENT

[75] Inventor: Terence M. Hancock, Prospect, Ky.

[73] Assignee: American Air Filter Company, Inc., Louisville, Ky.

[21] Appl. No.: 40,693

[22] Filed: May 21, 1979

[51] Int. Cl.³ ............................................. B01D 46/02
[52] U.S. Cl. ........................................ 55/377; 55/302; 55/341 R; 55/379
[58] Field of Search ..................... 55/302, 341 R, 379, 55/374–378

[56] References Cited

U.S. PATENT DOCUMENTS

| 3,747,305 | 7/1973 | O'Dell et al. | 55/341 R |
| 3,844,750 | 10/1974 | Ray | 55/302 X |
| 4,042,356 | 8/1977 | Miller | 55/379 X |
| 4,149,863 | 4/1979 | Ballard | 55/302 X |

FOREIGN PATENT DOCUMENTS 2736754  3/1979  Fed. Rep. of Germany ............ 55/377

Primary Examiner—Kathleen J. Prunner
Attorney, Agent, or Firm—Thomas G. Anderson

[57] ABSTRACT

A filter arrangement including a venturi element carried within a tubular filter by a flexible attachment ring at one end of the filter removably securing the filter in the aperture of an apertured plate member in a gas filtration system. The outermost diameter of the venturi element is slightly less than the diameter of the aperture to accommodate withdrawal of the venturi element from either side of the plate attendant to installation and removal of the filter arrangement.

10 Claims, 6 Drawing Figures

FILTER ARRANGEMENT

BACKGROUND OF THE INVENTION

1. Field of Invention

The present invention relates to gas separation devices and more particularly to a filter arrangement adapted to be connected to an apertured plate member.

2. Description of the Prior Art

The prior art includes a variety of filter arrangements adapted to be releasably connected to an apertured plate member. Typically, each arrangement includes a tubular filter having one end connected to an apertured support plate member, a basket or cage disposed within the filter to prevent inadvertent collapse or failure of the filter, and a venturi proximate the end of the filter adapted to direct and channel pulsed gasses into the filter during filter cleaning operations. These arrangements have usually required the use of tools to install and remove and generally have only been accessible from one side of the support plate.

SUMMARY OF THE INVENTION

The present invention relates to a gas separation device and in particular to a filter arrangement adapted to be releasably connected to an apertured plate member in flow-through communication with the plenum of a bag house or related gas filtration system.

The filter arrangement includes a flexible ring member connected with one end of a tubular filter and adapted to embrace the marginal edge of the plate aperture to removably secure the filter to the plate. A filter cage or support arrangement is provided within the filter which is connected with a venturi element cooperating with the ring member and extending therethrough into the interior of the filter. The venturi element includes an outwardly protruding annular shoulder carried by the ring member to support the venturi element within the filter, and a recessed throat portion generally adjacent the shoulder to accommodate manipulative flexure of the filter and ring member by a workman attendant to installation and removal of the filter arrangement.

To secure the filter arrangement to the plate, the recessed throat portion of the venturi element is first generally aligned with the plate in the plate aperture. This provides access to the marginal edge of the aperture such that a workman can manipulate the filter and ring member from either side of the plate to connect the filter to the plate. Thereafter, the entire arrangement is secured to the plate by drawing the venturi element through the ring member until the annular shoulder of the venturi element is engaged on the ring member. Conversely, to remove the filter arrangement from the plate, this process is reversed.

From the foregoing, it can be seen that the invention provides a convenient and easily maintained filter arrangement which permits rapid repair or replacement of the filter medium in a gas filtration system, it being understood that various changes can be made in the arrangement, form and construction of the apparatus disclosed herein without departing from the scope and spirit of the invention.

DESCRIPTION OF THE PREFERRED EMBODIMENT

Figure 1:
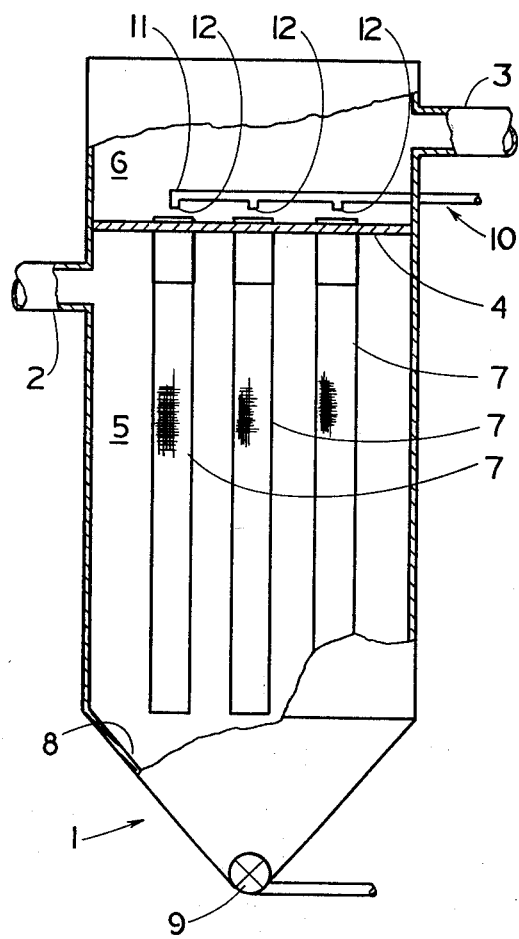
FIG. 1 is a side elevational view of a bag house, partially in section, embodying the invention.

As shown in FIG. 1, the gas cleaning arrangement embodying the present invention includes a filter housing or bag house 1 having a dirty gas inlet 2 and a clean gas outlet 3. The bag house 1 includes a transversely extending apertured plate or venturi sheet 4 which divides the bag house 1 into a dirty gas cleaning chamber 5 and a clean gas take-off chamber or plenum 6. As will be described, the venturi sheet 4 supports a plurality of tubular filter arrangements 7 within the dirty gas chamber 5 such that when dirty gas is directed through the inlet 2 into the cleaning chamber 5, it passes through the filter arrangements 7 and leaves the filter housing 1 through the plenum 6 and clean gas outlet 3. Particulate material separated from the dirty gas and deposited on the exterior of each filter is collected in a suitable hopper 8 positioned below the dirty gas chamber 5, and this material is in turn removed from the hopper through the discharge outlet 9 as is well known in the art. To accommodate cleaning of the filters, the filter housing includes a valve controlled reverse flow flushing arrangement 10. As shown schematically in FIG. 1, the flushing arrangement 10 includes an inlet pipe 11 connected to a source of compressed air and having air injection nozzles 12 positioned above each of the filter arrangements 7 to inject jets or pulses of air into each filter during filter cleaning operations.

Each of the filter arrangements 7 includes a flexible ring member 13 connected to one end of a gas permeable tubular filter bag or medium 14 and adapted to embrace the marginal edge 15 of the plate aperture 16. The filter bag 14, which is preferably of a fabric or cloth-like material, is folded back upon itself and secured by stitching 17 or the like (schematically shown by dotted lines in FIG. 2) to provide a filter cuff 18 entraining and thus securing the ring member 13 to the filter bag. The ring member includes a flexible back-up band member 19 and a flexible collar 20 surroundingly engaging the outer face of the band member. The back-up band member 19 has an outer diameter slightly less than the diameter of the plate aperture 16 and serves as a back-up member outwardly urging the collar 20 into sealing engagement with the marginal edge 15 of the aperture, it being understood that the band member 19 can be made from any one of several flexible, spring-like metallic or plastic materials. The flexible collar 20 is of a channel-like cross-sectional configuration having a pair of axially spaced peripheral ridges 21 and 22 of a diameter slightly greater than the diameter of the plate aperture 16 and defining an external groove 23 adapted to removably receive the marginal edge 15 to form a yielding seal between the ring member 13 and the plate 4. Preferably, the ridges 21 and 22 are formed by folding a fabric upon itself as disclosed in U.S. Pat. No. 3,747,305; however, various other arrangements providing axially spaced ridges in the outer face of the ring member to define the external groove can be used.

As noted above, the filter arrangement includes an elongated tubular venturi element 24 extending through the ring member 13 and into the interior of the filter bag 14 to channel or direct pulsed air from a respective nozzle 12 into the filter during cleaning operations. The venturi element, which may be made of metal, a thermoplastic, hard rubber of similar material, includes an inwardly recessed throat portion 25, an outwardly protruding or flared annular shoulder 26 at one end of the throat portion, and an outwardly protruding or flared attachment flange 27 at the other end of the throat portion.

The shoulder 26 axially outwardly overlies and is supported by the band 19 and includes a plurality of outwardly radiating plate-like flanges 28 spaced equidistant about the periphery of the venturi element 24. The outer edges 29 of the flanges 28 are slightly axially inwardly tapered or chamfered so as to engage the inner face of ring member and filter in pressfit wedging relation to align and secure the venturi element 24 within the filter bag. Additionally, it should be particularly noted that the invention accommodates removal of the venturi element and thus the filter arrangement from either side of the plate 4 by providing that the outermost diameter of the shoulder 26, which is substantially the same as the diameter of the band 19, be slightly less than the diameter of the plate aperture 16.

Figure 2:
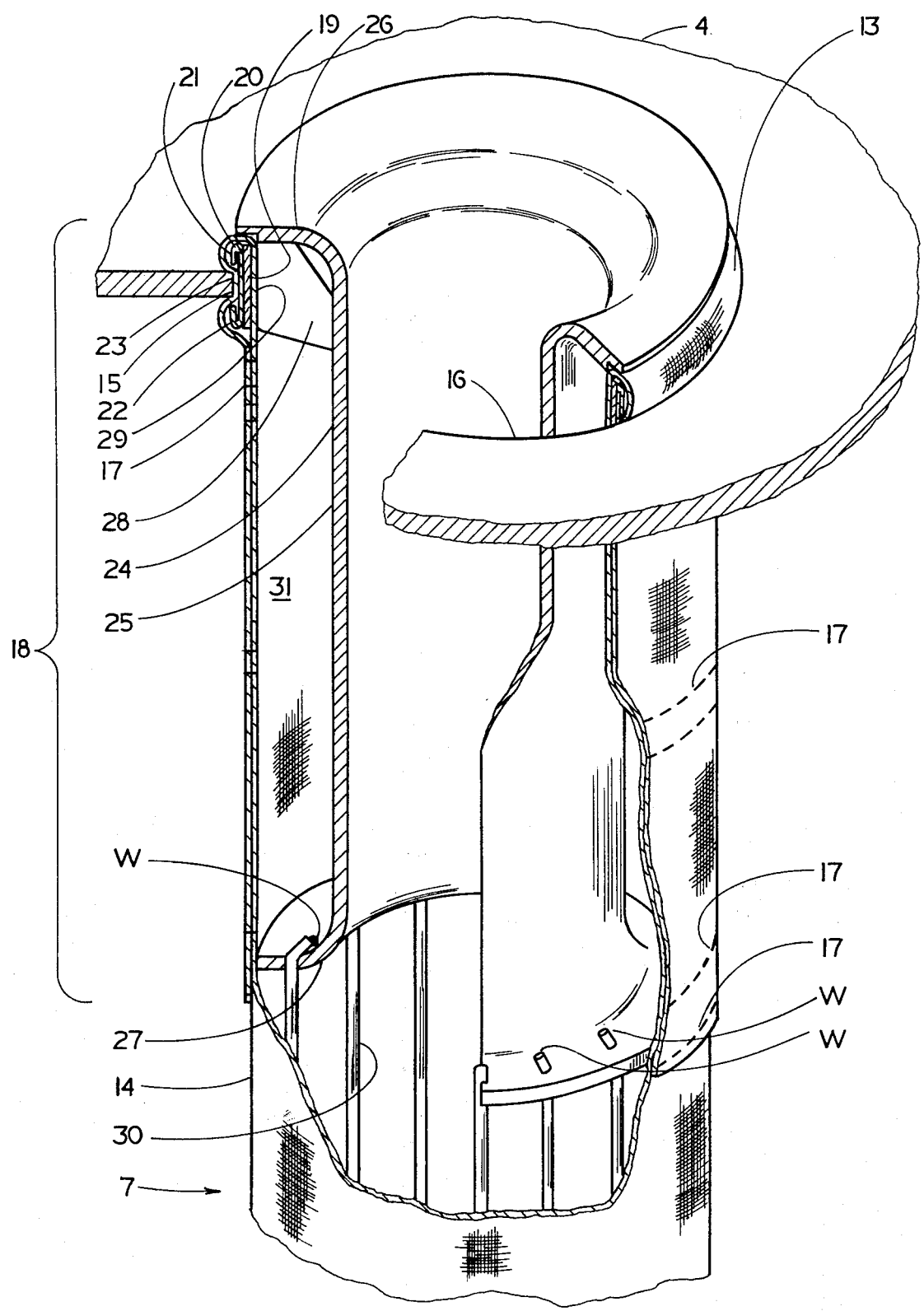
FIG. 2 is an enlarged isometric view, partially in section, showing the filter arrangement mounted on the plate member as shown in FIG. 1.

As shown in FIG. 2, supporting cage or basket 30 is provided within the filter 14. The basket 30, which is generally coextensive with the filter, is carried by the attachment flange 27 and preferably is rigidly secured to it by welding "w" or the like.

The invention further provides that the outer diameter of the attachment flange 27 be substantially the same diameter and contiguous with the interior of the filter bag 14. This arrangement effectively limits induced gas flow during pulsing or filter cleaning operations in the annular region generally indicated at 31 in FIG. 2 between the venturi element 24 and the cuff 18, thereby effectively abating bleed-through of particulate material into the filter. Similarly, by extending the cuff 18 such that it is generally coextensive with the venturi element 24, the arrangement further reduces particulate bleed-through since the double thickness of filter material folded upon itself is relatively impervious to gas flow with respect to the remainder of the filter.

Figure 3:
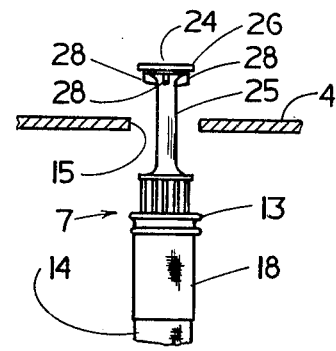
FIGS. 3, 4, 5 and 6 sequentially illustrate one method of installing the filter arrangement on the plate member.
Figure 4:
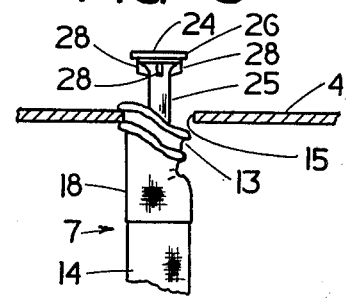
Figure 5:
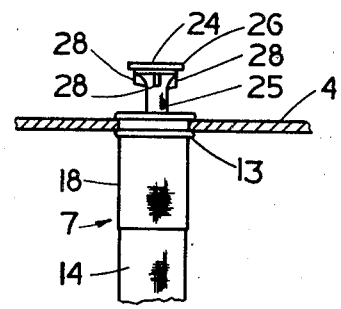
Figure 6:
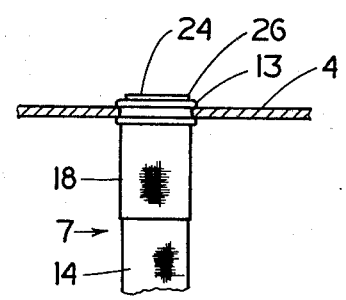

FIGS. 3-6 illustrate one method by which the filter arrangement 7 is secured to the apertured plate 4. As shown in FIG. 3, the recessed throat portion 25 is first generally aligned with the plate, and then the flexible ring member 13 is manipulated in the plate aperture until it embraces the marginal edge 15 to secure the filter 14 to the plate. Thereafter, the venturi element 24 is drawn or lowered through the ring member until the shoulder 26 is engaged on the ring member. As noted in the foregoing, this process is reversed to remove the ring member and thus the filter arrangement.

What is claimed is:

1. For a bag house including a plenum having an apertured bag support plate including an aperture of a predetermined diameter, a filter arrangement adapted to be connected with the plate in flow-through communication with the plenum through the plate aperture, comprising:

a tubular filter having a flexible end portion;
a flexible ring member connected with said flexible end portion, said ring member removably embracing the marginal edge of the plate aperture to secure the ring member and the filter to the plate;
a venturi element extending through said ring member into the interior of the filter;
said venturi element including an inwardly recessed throat portion, an outwardly protruding annular shoulder proximate one end of said throat portion, and an attachment portion spaced from said shoulder within the filter;
said annular shoulder axially overlying the ring member and being carried thereby to support the venturi element within the filter, the outermost diameter of said shoulder being less than the diameter of the plate aperture to accommodate withdrawal of the venturi element from either side of the plate upon removal of the ring member;
said throat portion accommodating manipulative flexure of said ring member upon selective axial displacement of the venturi element with respect to the plate attendant to installation and removal of the filter arrangement;
filter support means carried by said attachment portion within the filter; and
said venturi element being of an elongated tubular configuration having axially outwardly flared end portions, one of said end portions providing said annular shoulder and the other of said end portions providing said attachment portion.

2. The invention according to claim 1, and
said flexible end portion being substantially coextensive with the venturi element and relatively impervious to gas flow with respect to the remainder of the filter.

3. The invention according to claim 1, and
said flexible end portion being folded back upon itself to define an annular space containing said flexible ring member to connect said member to the flexible end portion.

4. The invention according to claim 1, and
said filter support means being an elongated tubular basket generally contiguous with the interior of the filter and having one end rigidly secured to said attachment portion.

5. The invention according to claim 1, and said ring member having an outer collar portion having an external groove about its periphery removably receiving the marginal edge of the plate aperture to form a yielding seal between the ring member and the plate.

6. The invention according to claim 5, and
said flexible ring member including a flexible band member having an outer diameter substantially the same as the outermost diameter of said annular shoulder;
said shoulder axially overlying and being supported by said band member, and having outwardly protruding flange means extending generally coextensively through said ring member removably engaging the inner face of said band member in outward press-fit wedging relation; and
said collar portion surroundingly engaging the outer face of said band member and being of channel-like cross-sectional configuration including peripheral ridges having a diameter slightly greater than the diameter of said plate aperture and being axially spaced to define said external groove.

7. The invention according to claim 6, and
said collar portion being formed of a cloth-like fabric folded upon itself to define said channel-like cross-sectional configuration.

8. For a bag house including a plenum having an apertured bag support plate including an aperture of a predetermined diameter, a filter arrangement adapted to be connected with the plate in flow-through communication with the plenum through the plate aperture, comprising:

a tubular filter having a flexible end portion;

a flexible ring member connected with said flexible end portion, said ring member removably embracing the marginal edge of the plate aperture to secure the ring member and the filter to the plate;

a venturi element extending through said ring member into the interior of the filter;

said venturi element including an inwardly recessed throat portion, an outwardly protruding annular shoulder proximate one end of said throat portion, and an attachment portion spaced from said shoulder within the filter;

said annular shoulder axially overlying the ring member and being carried thereby to support the venturi element within the filter, the outermost diameter of said shoulder being less than the diameter of the plate aperture to accommodate withdrawal of the venturi element from either side of the plate upon removal of the ring member;

said throat portion accommodating manipulative flexure of said ring member upon selective axial displacement of the venturi element with respect to the plate attendant to installation and removal of the filter arrangement;

said attachment portion including an annular flange outwardly protruding from said throat portion;

said annular flange having an outer diameter substantially the same as the diameter of the interior of the filter and being generally contiguous therewith; and filter support means carried by said attachment portion within the filter.

9. The invention according to claim 8, and said flexible end portion axially outwardly spanning said throat portion between said annular shoulder and attachment portion; and said flexible end portion being relatively impervious to gas flow with respect to the remainder of the filter.

10. The invention according to claim 9, and said tubular filter being folded back upon itself to provide said flexible end portion.

* * * * *